(12) United States Patent
Sase et al.

(10) Patent No.: US 7,479,988 B2
(45) Date of Patent: *Jan. 20, 2009

(54) VIDEO CAMERA APPARATUS USING AN IMAGE SENSOR

(75) Inventors: Masatoshi Sase, Kanagawa (JP); Hidehiko Teshirogi, Kanagawa (JP); Seishin Asato, Chiba (JP)

(73) Assignee: Sony Corporation, Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 11/101,348

(22) Filed: Apr. 6, 2005

(65) Prior Publication Data

US 2005/0179792 A1    Aug. 18, 2005

Related U.S. Application Data

(63) Continuation of application No. 09/357,262, filed on Jul. 20, 1999, now Pat. No. 6,970,191.

(30) Foreign Application Priority Data

Jul. 22, 1998    (JP)    ................... 10-206959

(51) Int. Cl.
*H04N 5/225* (2006.01)
*H04N 5/228* (2006.01)
*H04N 5/335* (2006.01)
*H04N 5/00* (2006.01)
*H04N 5/91* (2006.01)

(52) U.S. Cl. ............... 348/220.1; 348/222.1; 348/317; 386/120; 386/124

(58) Field of Classification Search ............. 348/220.1, 348/222.1, 230.1, 231.9, 317; 386/120, 124
See application file for complete search history.

(56) References Cited

U.S. PATENT DOCUMENTS

| 4,963,980 | A |   | 10/1990 | Suga et al. |
| 5,111,263 | A | * | 5/1992  | Stevens ..................... 348/322 |
| 5,231,500 | A |   | 7/1993  | Miyaji et al. |
| 5,264,939 | A |   | 11/1993 | Chang |
| 5,349,385 | A |   | 9/1994  | Glenn |
| 5,440,343 | A | * | 8/1995  | Parulski et al. ........... 348/220.1 |
| 5,444,482 | A |   | 8/1995  | Misawa et al. |

(Continued)

FOREIGN PATENT DOCUMENTS

JP    4 61978    5/1992

(Continued)

*Primary Examiner*—Nhan T Tran
(74) *Attorney, Agent, or Firm*—Frommer Lawrence & Haug LLP; William S. Frommer; Thomas F. Presson

(57) ABSTRACT

The video camera apparatus obtains a still image sensing signal with high image quality in a progressive scan mode and is capable of recording onto a recording medium by a recording means which performs recording operation corresponding to an interlace scan mode. An image sensing signal read from a CCD image sensor 23 in the interlace scan mode is recorded directly onto a recording medium by a recording/reproducing section 5 through a camera signal processing circuit 24, while an image sensing signal read from the CCD image sensor 23 in the progressive scan mode is converted into an interlace scan signal and is then recorded onto a recording medium by the recording/reproducing section 5.

10 Claims, 9 Drawing Sheets

U.S. PATENT DOCUMENTS

| | | | |
|---|---|---|---|
| 5,838,373 A | 11/1998 | Hasegawa et al. | |
| 5,841,471 A | 11/1998 | Endsley et al. | |
| 6,011,583 A | 1/2000 | Hieda et al. | |
| 6,118,115 A * | 9/2000 | Kozuka et al. | 348/241 |
| 6,124,888 A | 9/2000 | Terada et al. | |
| 6,356,306 B1 | 3/2002 | Kobayashi | |
| 6,377,301 B1 | 4/2002 | Hieda | |
| 6,515,703 B1 | 2/2003 | Suzuki et al. | |
| 6,519,000 B1 | 2/2003 | Udagawa | |

FOREIGN PATENT DOCUMENTS

| | | |
|---|---|---|
| JP | 7 135592 | 5/1995 |
| JP | 9 98328 | 4/1997 |
| JP | 10 191152 | 7/1998 |
| JP | 10 191172 | 7/1998 |

* cited by examiner

VIDEO CAMERA APPARATUS USING AN IMAGE SENSOR

This is a continuation of application Ser. No. 09/357,262, filed Jul. 20, 1999, now U.S. Pat. No. 6,970,191 the entirety of which is incorporated herein by reference.

TECHNICAL FIELD

The present invention relates to video camera apparatus which picks up images while switching the operation mode of its solid image sensor between an interlace scan mode and a progressive scan mode.

BACKGROUND ART

Conventionally, in a video camera apparatus according to a standard television system such as NTSC (National Television Systems Committee) or PAL (Phase Alternation by Line), an interlace-scanned image sensing signal is obtained from an image sensing section and is outputted as a video signal according to a predetermined standard television system. Further, a video cassette recorder (VCR) or a video tape recorder (VTR) integrated with a camera, which is a so-called camcorder, deals with a video image depending on a video signal according to a predetermined standard television signal, generated from an interlaced image sensing signal. In case of dealing with a still image in the camcorder, since two fields of the interface-scanned image sensing signal form an image corresponding to one frame, a time delay between fields causes deterioration of image quality. Therefore, recording/reproducing of a still image is carried out by converting an interlaced signal into a progressive-scan signal.

In contrast, in an electronic still camera specialized for still images, a still-image-sensing signal of high quality obtained by progressive scanning from a solid image sensor capable of progressive scanning is recorded onto a recording medium.

However, a conventional camcorder is capable of realizing only an interlace scan mode and cannot attain or record an image sensing signal which is compatible both the interlace scan mode and the progressive scan mode.

Hence, the present invention has an object of providing a video camera apparatus capable of attaining a still image sensing signal of high quality by the progressive scan mode and of recording the signal onto a recording medium by a recording means which performs recording operation compatible with the interlace scan mode.

DISCLOSURE OF THE INVENTION

A video camera apparatus according to the present invention comprises: a solid image sensor for outputting an image sensing signal in an interlace scan mode or a progressive scan mode; image sensing signal processing means supplied with the image sensing signal from the solid image sensor; scan converter means supplied with the image sensing signal from the image sensing signal processing means, for converting the image sensing signal read out from the solid image sensor in the progressive scan mode, into an interlace scan signal; control means for performing control of switching an input to recording means, in correspondence with an operation mode of the solid image sensor; and the recording means for recording the image sensing signal read out from the solid image sensor in the interlace scan mode, directly onto a recording medium, and for converting the image sensing signal read out from the solid image sensor in the progressive scan mode, into an interlace scan signal, by the scan converter means, and then recording the interlace scan signal onto the recording medium.

Also, an image signal recording method according to the present invention comprises steps of: subjecting an image sensing signal from a solid image sensor which outputs the image sensing signal in an interlace scan mode or a progressive scan mode, to signal processing; and recording, onto a recording medium, the image sensing signal read from the solid image sensor in the interlace scan mode, or an image sensing signal obtained by converting the image sensing signal read from the solid image sensor in the progressive scan mode, into an interlace signal.

As has been described above, in the image recording apparatus according to the present invention, image sensing operation is performed while switching the operation mode of the solid image sensor between the interlace scan mode and the progressive scan mode. The image sensing signal read from the solid image sensor in the interlace scan mode is directly recorded onto a recording medium through the image sensing signal processing means. The image sensing signal read from the solid image sensor in the progressive scan mode is converted into an interlace scan signal by the scan converter means and is then recorded onto a recording medium. In this manner, it is possible to obtain a still image sensing signal with high quality and to record the signal onto a recording medium by a recording means which performs recording operation corresponding to the interlace scan mode.

BRIEF DESCRIPTION OF THE DRAWINGS

FIG. 9 is a view for explaining the setting of the progressive scan mode in the camera mode of the camcorder.

BEST MODE FOR CARRYING OUT THE INVENTION

In the following, embodiments of the present invention will be explained in details with reference to the drawings.

Figure 1:
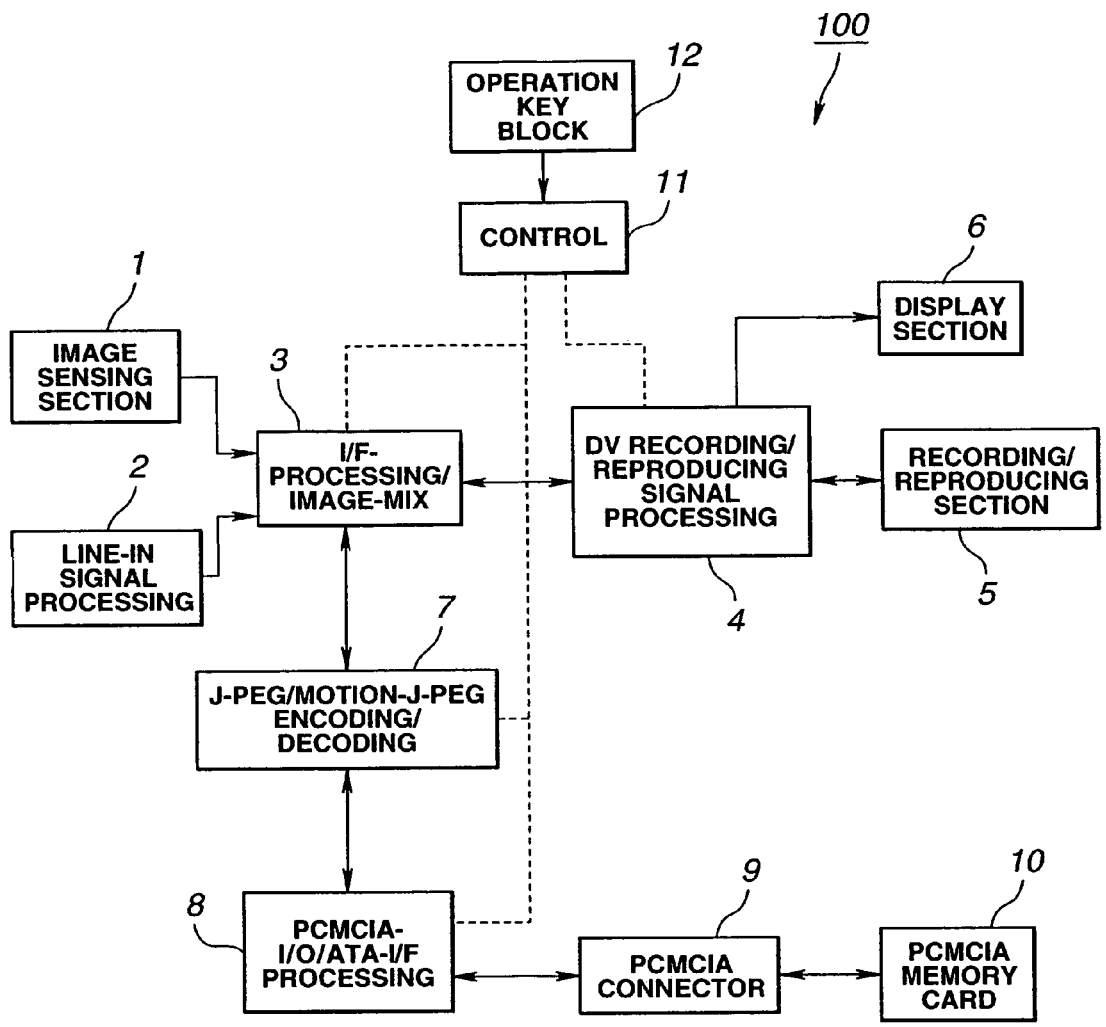
FIG. 1 is a block diagram showing the structure of a camcorder to which the present invention is applied.

For example, the present invention is applied to a camcorder 100 constructed in a structure as shown in FIG. 1. This camcorder 100 comprises an I/F-processing/image-MIX circuit 3 supplied with an image signal from an image sensing section 1 and/or a line-in signal processing circuit 2, a recording/reproducing section 5 and a display section 6 connected to the circuit 3 through a DV recording/reproducing signal processing circuit 4, an I/F processing circuit 8 connected to the circuit 3 through an encoder/decoder circuit 7, a PCMCIA (Personal Computer Memory Card International Association) memory card 10 detachably connected to the circuit 8 through a connector 9, a control section 11 for controlling these components, and an operation block 12 connected to the control section 11.

Figure 2:
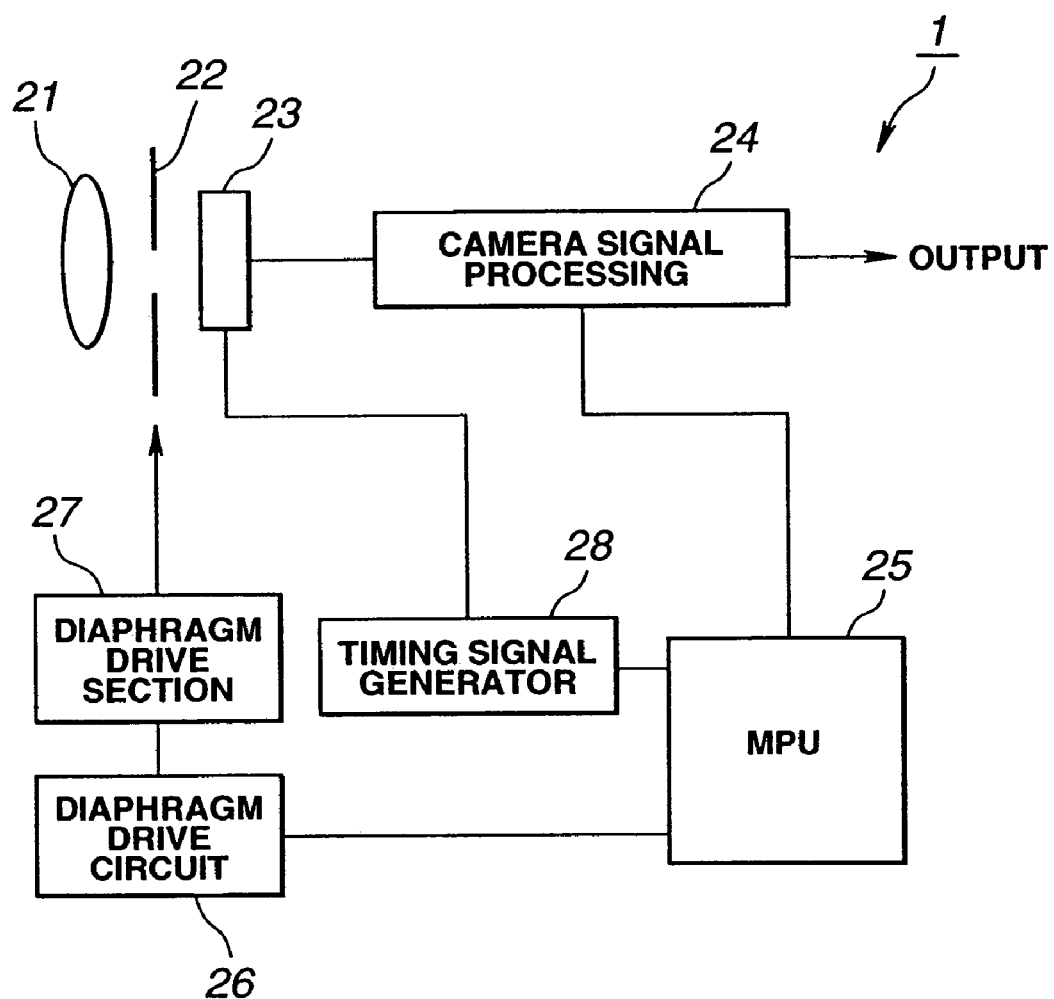
FIG. 2 is a block diagram showing the schematic structure of an image sensing section of the camcorder.
Figure 3:
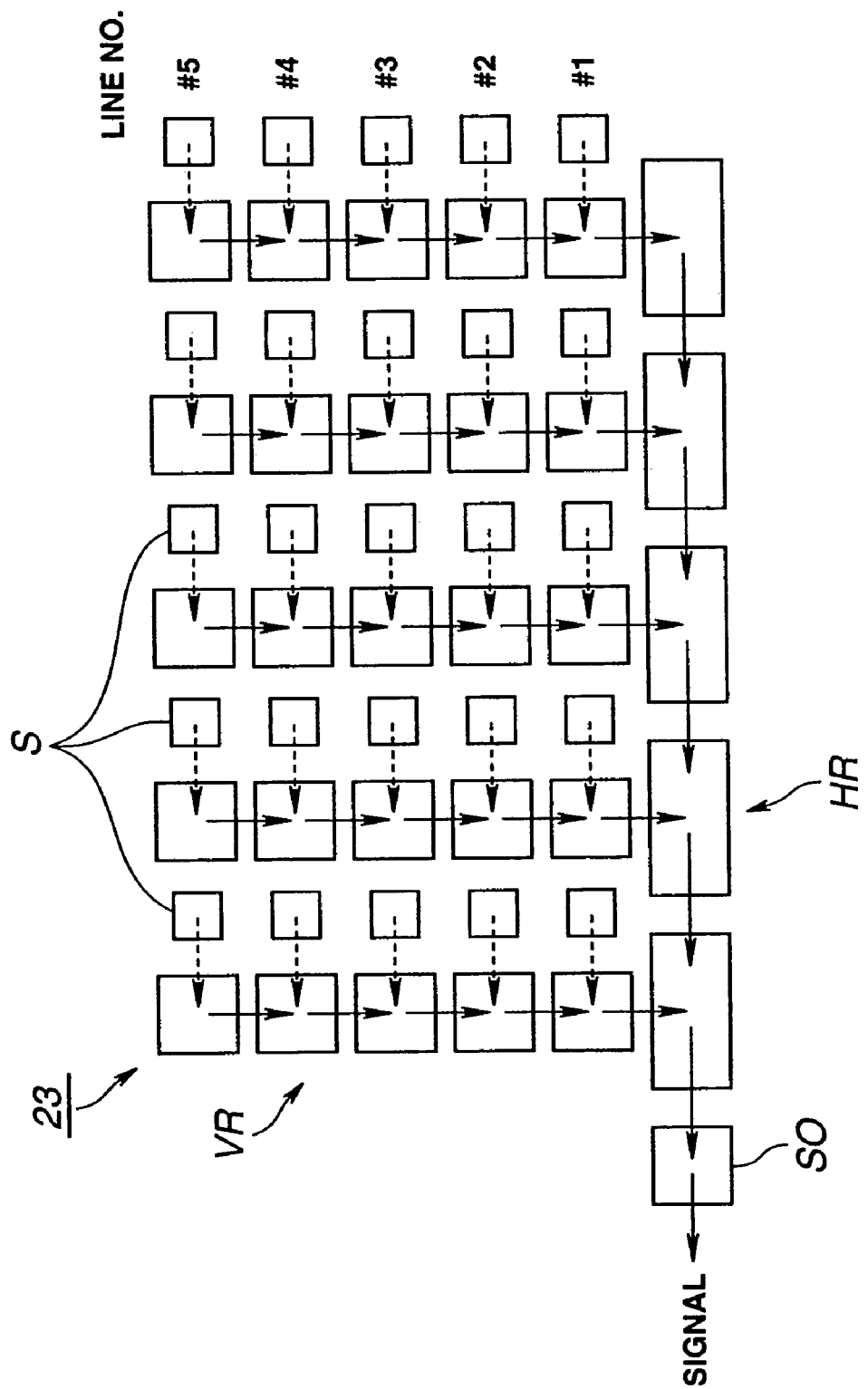
FIG. 3 is a plan view schematically showing the structure of a CCD image sensor of the image sensing section.
Figure 4:
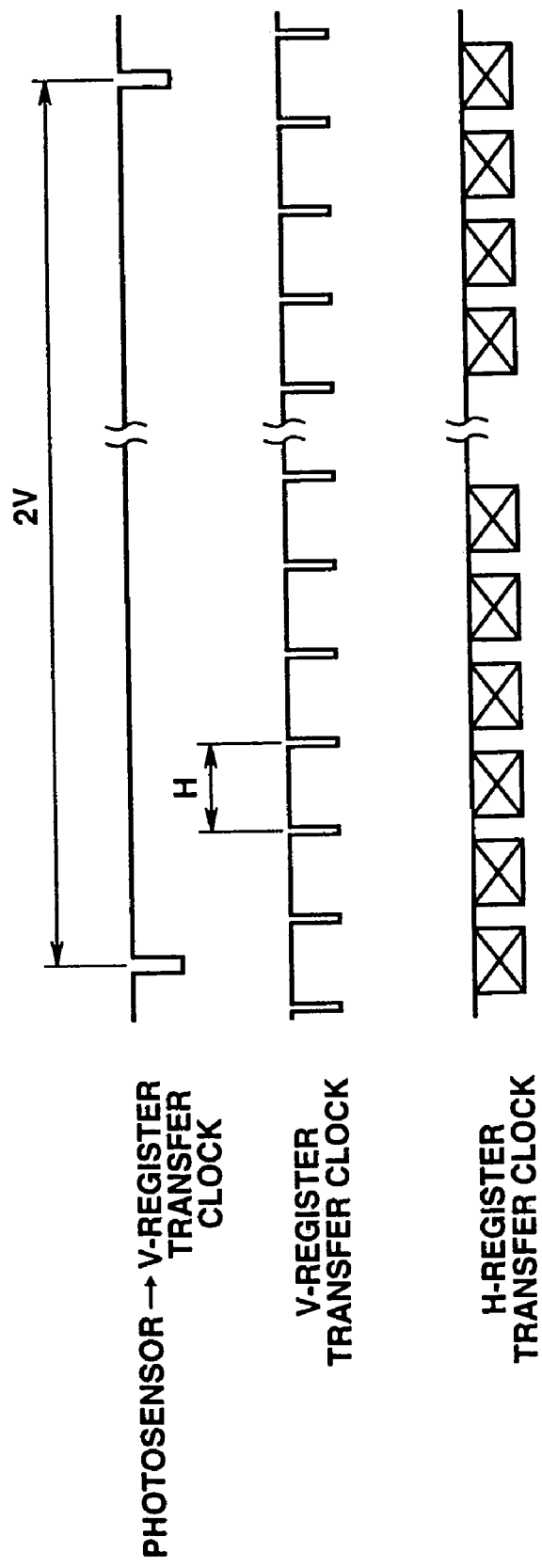
FIG. 4 is a timing chart showing image sensing operation of the CCD image sensor in the progressive scan mode.

The image sensing section 1 includes a CCD image sensor 23 to which image sensing light enters through a diaphragm 22 from the image sensing lens 21, as can be seen from the schematic structure shown in FIG. 2. An image sensing signal obtained as an image sensing output by the CCD image sensor 23 is outputted through a camera signal processing circuit 24.

The diaphragm 22 is driven by a diaphragm drive section 27 connected to a diaphragm drive circuit 26 supplied with a diaphragm control signal from a camera control microcomputer 25.

Also, the CCD image sensor 23 is driven in such a manner that various timing signals such as a sensor gate signal, a transfer clock, and the like are supplied to the CCD image sensor 23 from a timing signal generator 28.

The camera signal processing circuit 24 and the timing signal generator 28 are arranged such that operation modes are switched in accordance with a control signal supplied from the camera control microcomputer 25.

The CCD image sensor 23 comprises photosensors S arranged in form of a matrix so as to correspond to pixels, vertical transfer registers VR from which image sensing charges of the pixels obtained by the photosensors are read out, horizontal transfer registers HR to which image sensing charges of the pixels of are transferred through the vertical transfer registers VR for every horizontal line, and an output section SO. The image sensing charges of the pixels are outputted as image sensing signals through the output section SO from the horizontal transfer registers HR, for every horizontal line. This CCD image sensor 23 is a CCD image of progressive scan type, and there are provided vertical transfer registers VR corresponding in number to the pixels constituting one horizontal line. Each vertical transfer register VR has transfer steps corresponding in number to the number of pixels in the vertical direction.

Further, the timing signal generator 28 generates a sensor gate signal SG of 2 fields (2V) equivalent to one frame cycle (1 F), a vertical transfer clock CKV of 1 horizontal scan cycle (1 H), and a horizontal transfer clock CKH of a frequency corresponding to the number of pixels on the horizontal line, when the progressive scan mode is set by a control signal supplied from the camera control microcomputer 25.

That is, in the progressive scan mode, image sensing charges of the pixels obtained by the respective photosensors S of the CCD image sensor 23 are read out to the vertical transfer registers VR by means of the sensor gate signal SG, for every two fields equivalent to 1 frame period (1 F). The image sensing charges read onto the vertical transfer registers VR are transferred to the horizontal transfer registers HR, for every one horizontal scanning period. At last, the image sensing charges of the pixels are outputted through the output section SO, for every horizontal line. As a result of this, image sensing signals of the horizontal lines are outputted as progressive scan signals in the order of #1, #2, #3.

Figure 5:
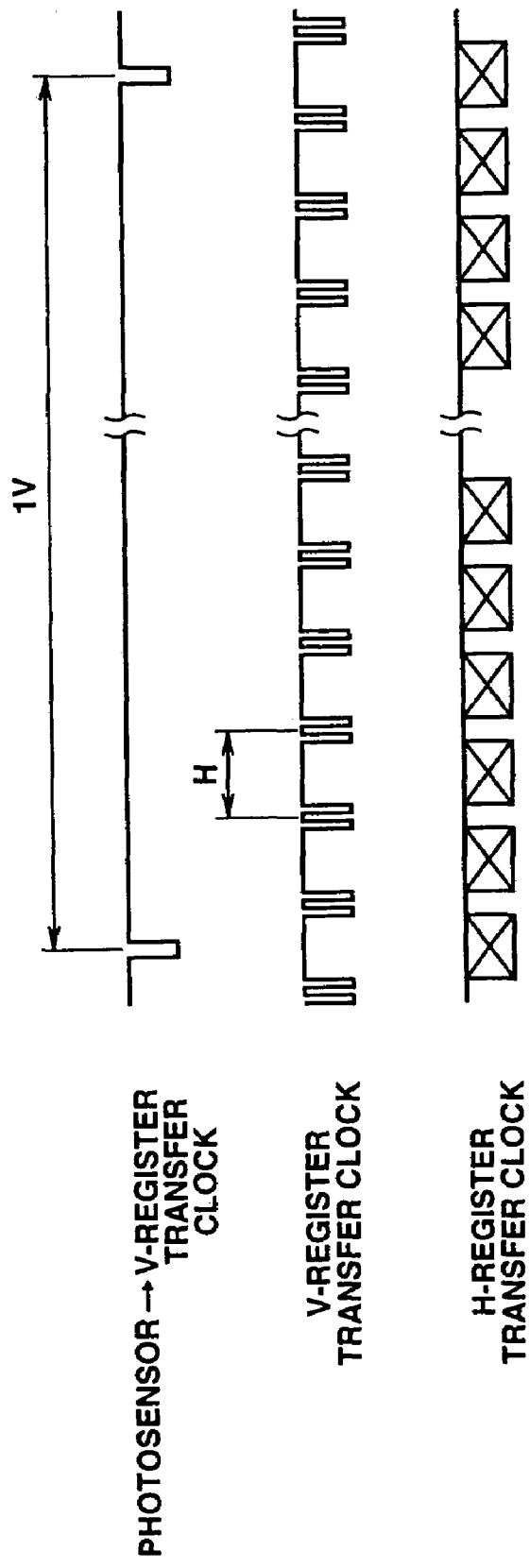
FIG. 5 is a timing chart showing image sensing operation of the CCD image sensor in the interlace scan mode.

Also, as shown in FIG. 5, when the interlace scan mode is set by a control signal supplied from the camera control microcomputer 25, the timing signal generator 28 generates a sensor gate signal SG at 1 field cycle (1V), two continuous vertical transfer clocks CKV for every 1 horizontal scanning period (1 H), and a horizontal transfer clock CKH at a frequency corresponding to the number of pixels in one scanning line.

That is, in the interlace scan mode, the image sensing charges of the pixels obtained by the photosensors S of the CCD image sensor 23 are read out onto the vertical transfer registers VR by a sensor gate signal SG, for every one field period (1V). The image sensing charges read onto the vertical transfer registers VR are transferred to the vertical transfer registers HR, for every two horizontal lines in each horizontal scanning period (1 H). The charges of every adjacent two pixels are added (synthesized) together in the horizontal transfer registers HR, so the number of horizontal lines is reduced to ½, and the image sensing charges of the pixels are outputted as an image-sensing signal from the horizontal transfer registers HR through the output section SO, for every horizontal line. As a result of this, the image sensing signals are outputted as interlace scan signals. The combination of the adjacent two pixels is changed between the odd-numbered field and the even-numbered field. Specifically, in the odd-numbered field, image sensing signals of the horizontal lines are obtained such that two lines are mixed in the order of #1, #2+#3, #4+#5, In the even-numbered field, image sensing signals of the horizontal lines are obtained such that two lines are nixed in the order of #1+#2, #3+#4.

Further, in this camcorder 100, the I/F-processing/image-MIX circuit 3 performs interface processing on the signals inputted from the image sensing section 1 and the line signal processing circuit, and also performs mixing of the signals.

Figure 6:
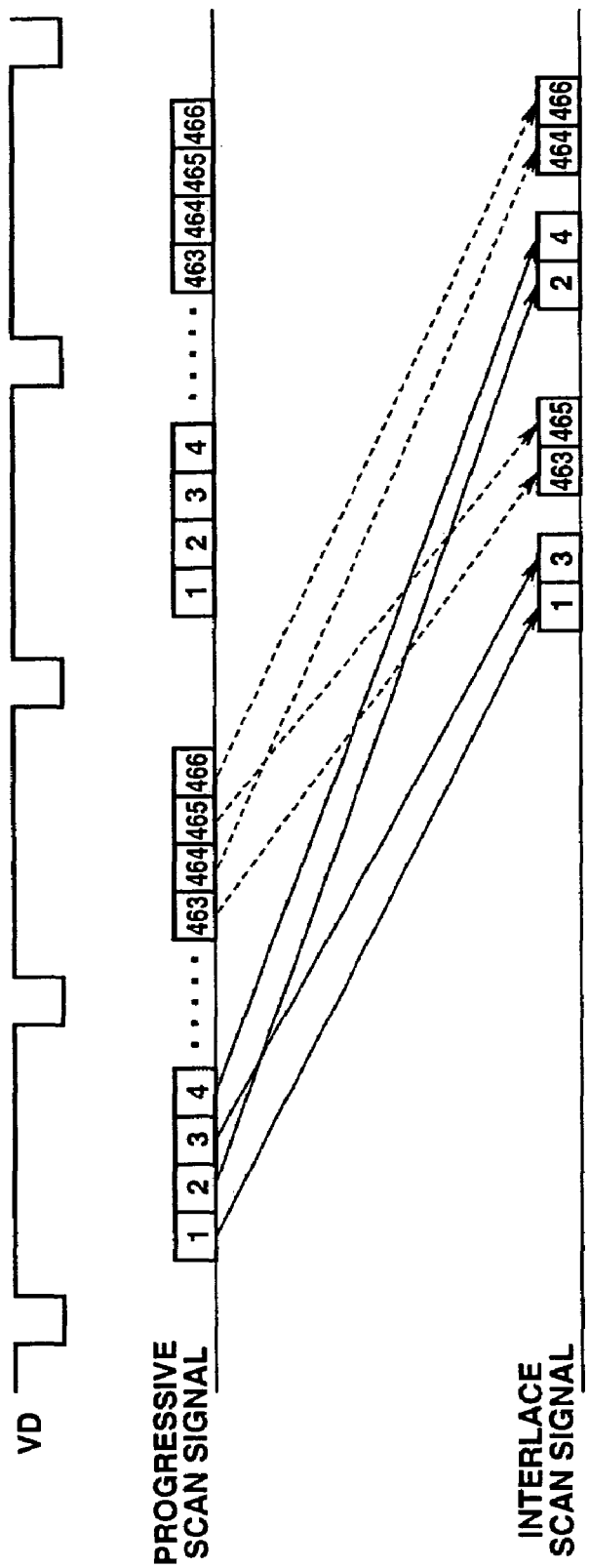
FIG. 6 is a timing chart showing the function of scan conversion in the camcorder.

Also, the operation mode of the I/F-processing/image-MIX circuit 3 is switched together with that of the CCD image sensor 23 of the image sensing section 1, by the control section 11. In the progressive scan mode, as shown in FIG. 6, the image sensing signal read from the CCD image sensor 23 of the image sensing section 1 in the progressive scan mode is converted into an interlace scan signal and is then supplied to a DV recording/reproducing signal processing circuit 4. In the interlace scan mode, the image sensing signal read from the CCD image sensor 23 is directly supplied to the DV recording/reproducing signal processing circuit 4.

Also, the DV recording/reproducing signal processing circuit 4 performs signal processing with respect to recording/reproducing of information signals according to the so-called digital video (DV) standard. Further, the recording/reproducing section 5 records information signals from the DV recording/reproducing signal processing circuit 4 onto a recording medium. Also, the section 5 reproduces information signals from the recording medium and supplies the signals to the DV recording/reproducing signal processing circuit 4. For example, a magnetic tape is used as the magnetic recording medium.

The display section 6 serves to display information signals recorded/reproduced through the DV recording/reproducing signal processing circuit 4.

The encoder/decoder circuit 7 serves to decode a still image according to the JPEG (Joint Photographic Expert Group) standard or a video image according to the Motion JPEG standard, into an image signal, or to encode an image signal of a still image or a video image into an encoded image according to the standards described above. This encoder/decoder circuit 7 performs the above processing on image signals or encoded images from the I/F-processing/image-MIX circuit 3 or the PCMCIA I/O/ATA I/F processing circuit 8.

Further, the PCMCIA I/O/ATA I/F 8 is a circuit which functions as an interface between JPEG/Motion-JPEG encoder/decoder circuit 7 and the PCMCIA memory card 10. Also, the PCMCIA connector 12 is a connector according to the PCMCIA standard.

Figure 7:
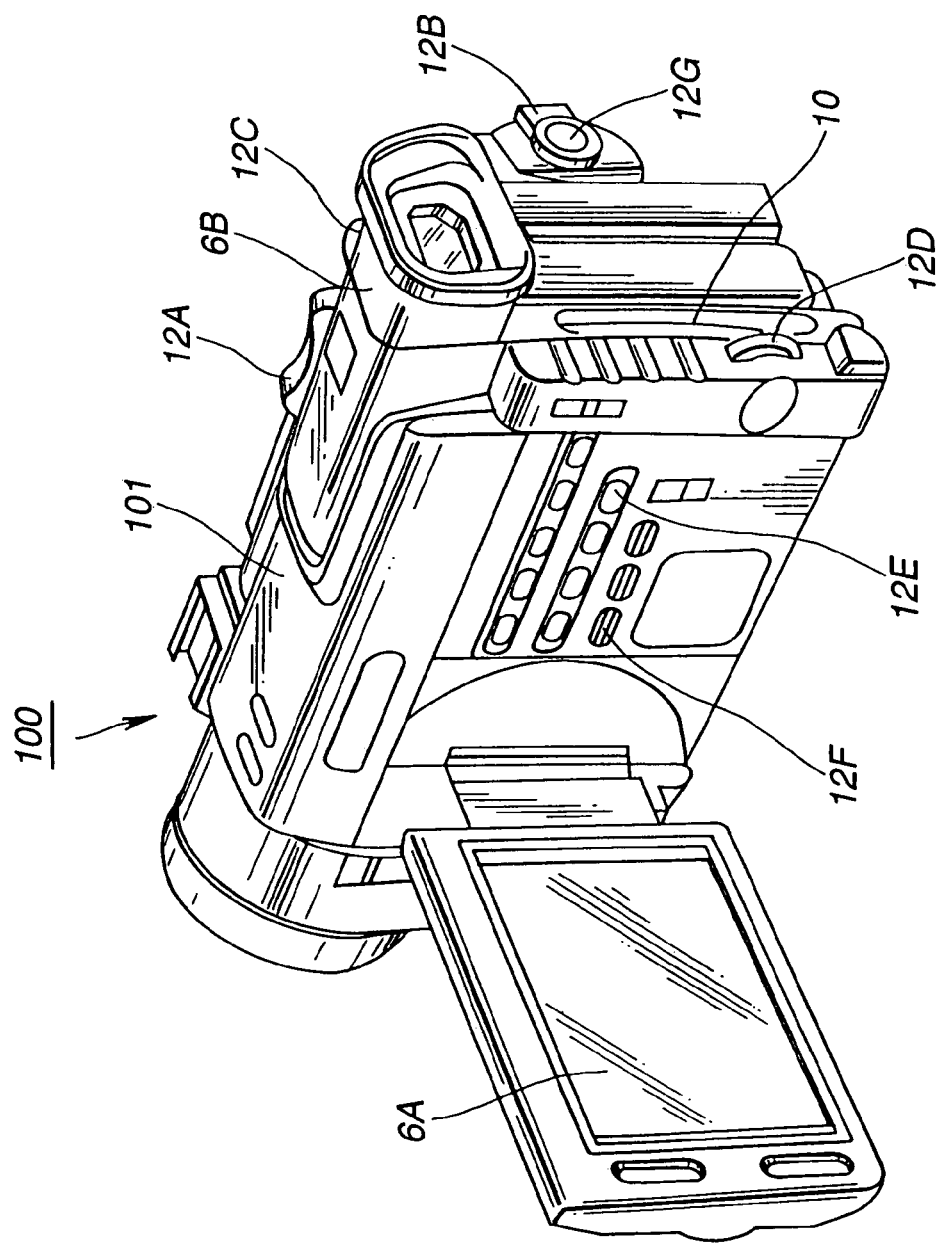
FIG. 7 is a perspective view showing the outer appearance of the camcorder.

As for the camcorder 100, the outer appearance of the camera body 101 is shown in the perspective view in FIG. 7. The camera body 101 is provided with an electronic view finder 6A and a liquid crystal display panel 6B, as the display section 6. As for the operation block 12, the camera body 101 is provided with various setting operation buttons such as a zoom operation lever 12A, an operation mode switch lever 12B, a still image sensing operation button 12C, a control dial 12D, a menu button 12E, a data code button 12F, and the like.

The zoom operation lever 12A supplies the control section 11 with zoom operation input data corresponding to the operation position of the lever. Further, the control section 11 controls the zoom drive section of the image-sensing lens 21 of the image sensing section 1 in accordance with the zoom operation input data.

Figures 8, 9A, 9B:
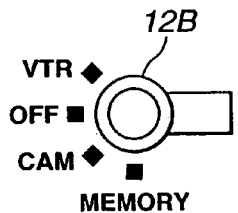
FIG. 8 is a view showing switch positions of an operation mode switch lever provided for the camcorder.

Also, as shown in FIG. 8 the operation mode switch lever 12B has four switch setting positions as follows.
POSITION 1: VTR
POSITION 2: OFF
POSITION 3: CAM
POSITION 4: MEMORY Operation input data corresponding to each position is supplied to the control section 11. Also, the still image sensing operation button 12C is pushed in two steps, so operation input data pieces corresponding to the push positions in the first step and the second step can be supplied to the control section 11. Further, the control section 11 controls the image sensing section 1, the I/F-processing/image-MIX circuit 3, the DV recording/reproducing signal processing circuit 4, the recording/reproducing section 5, the encoder/decoder circuit 7, the I/F processing circuit 8, and the like, in the following manner, in accordance with the operation input data.

That is, in the camcorder 100, the control section 11 sets the camcorder 100 in the VTR mode when the operation mode switch lever 12B is at the position 1. In the VTR mode, the control section 11 receives an operation input through a VTR operation button not shown and controls the recording/reproducing section 5 in accordance with the operation input. For example, reproducing by the recording/reproducing section 5 is started when the reproducing button is operated.

Also, the control section 11 sets the camcorder in a operation stop state, when the operation switch lever 12B is at the position 2.

Also, the control section 11 sets the camcorder in the camera mode, when the operation mode switch lever 12B is at the position 3. In the camera mode, the control section 11 operates the image sensing section 1 so as to display an image based on an image sensing signal, on the display section, e.g., the electronic view finder 6A or the liquid crystal display panel 6B. Further, when an operation input from a start/stop button 12G is received in this image sensing stand-by state, recording by the recording/reproducing section 5 is started. When another operation input from the start/stop button 12G is received again, the recording is terminated and the image sensing stand-by state is recovered.

Also, in the camera mode, the control section 11 accepts operation input data by a push operation on the still image sensing operation button 12C. If the operation input data by the push operation on the still image sensing operation button 12C is accepted in the image sensing stand-by state, the image sensing signal obtained by the image sensing section 1 is captured as a still image and is displayed on the display section 6, at the push position in the first step of the still image sensing operation button 12C. If the still image sensing operation button 12C is further pushed to the push position at the second step, the captured still image is recorded by the recording/reproducing section 5 for a predetermined time period (e.g., 7 seconds in this example). Note that voice can also be recorded by the recording/reproducing section 5 during recording. If the still image sensing operation button 12C is released before it reaches the push position of the second step, the still image to be recorded by the recording/reproducing section 5 can be reselected. If the still image sensing operation button 12C is pushed during camera recording, the control section 11 controls the recording/reproducing section 5 so as to record the image at this time as a still image, for a predetermined time period (e.g., 7 seconds in this example) and returns again to the image sensing stand-by state after completion of this recording. That so, control section 11 sets the camcorder 100 in the memory made when the operation mode switch lever 12B is at the position 4.

In this memory mode, the control section 11 forcedly switches the operation mode of the image sensing section 1 to the progressive scan mode. Further, when the control section 11 receives operation input data by a push operation on the still image sensing operation button 12C in this memory mode, an image sensing signal obtained as a progressive scan signal is captured by the image sensing section 1 and is displayed on the display section 6, at the push position of the first step of the still image-sensing operation button 12C. When the still image sensing operation button 12C is further pushed to the push position of the second step, the captured still image is recorded onto the memory card 10. Note that the still image to be recorded onto the memory card 10 can be reselected if the still image sensing operation button 12C is not pushed up to the push position of the second step but is released.

Setting of the progressive scan mode in the camera mode is carried out as follows. The menu screen is displayed on the display section 6 by pushing the menu button 12 provided on the camera body 101 in the image sensing stand-by state, and the "PROGRESSIVE" is switched from "OFF" to "ON" as shown in FIGS. 9(A) and (B), by turning the control dial 12D.

In the camcorder 100 constructed in this structure, the image sensing signal obtained as a progressive scan signal in the progressive scan mode by the image sensing section 1 cannot be directly displayed on the display section 6 which operates with an interlace scan signal. Therefore, the progressive scan signal is converted into an interlace scan signal by the I/F-processing/image-MIX circuit 3 and is then displayed on the display section 6. Also, in this camcorder 100 in the camera mode, the image sensing operation is performed by switching the operation mode of the image sensing section 1 to the progressive scan mode, and the image sensing signal with high quality obtained as a progressive scan signal by the image sensing section 1 is converted into an interlace scan signal by the I/F-processing/image-MIX circuit 3 and is then recorded onto a magnetic tape by the recording/reproducing section 5. Since the recording/reproducing section 5 is a recording means which uses a magnetic tape as a recording medium, there is almost no limitation to the recording capacity, but still images based on image sensing signals with high quality obtained as progressive scan signals by the image sensing section 1 in the all-pixels reading mode can be sequentially recorded onto the magnetic tape.

Figure 10:
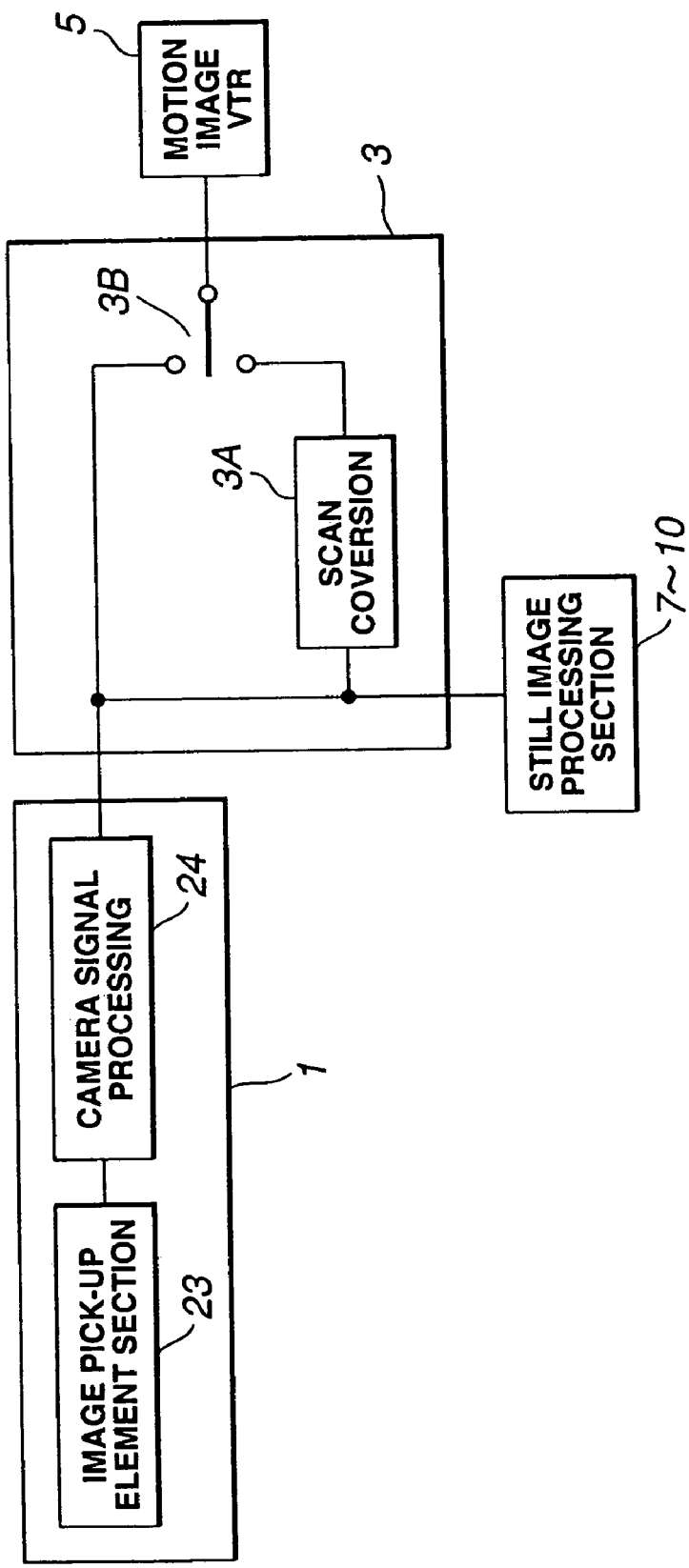
FIG. 10 is a block diagram showing the structure of a main part of the camcorder.

The camcorder 100, as shown in FIG. 10 which illustrates the structure of its main part, comprises a CCD image sensor 23 capable of outputting image sensing signals while switching the operation mode between the interlace scan mode and the progressive scan mode, a camera signal processing circuit 24 supplied with an image sensing signal from the CCD image sensor 23, a scan converter section 3A which is supplied with an image sensing signal from the camera signal processing circuit 24 and converts the image sensing signal read from the CCD image sensor 23 in the progressive mode, into an interlace scan signal, a recording/reproducing section 5 which records image sensing signals supplied from the camera signal processing circuit 24 or the scan converter section 3A, and a switch 3B which switches the input to the recording/reproducing section 5 together with the operation mode of the CCD image sensor 23. In the recording/reproducing section 5, the image sensing signal read from the CCD image sensor 23 in the interlace scan mode is directly recorded onto a recording medium through the camera signal processing circuit 24, and the image sensing signal read from the CCD image sensor 23 in the progressive scan mode is converted into an interlace scan signal by the scan converter section 3A and is then recorded onto a recording medium. Note that the scan converter section 3A and the function of the switch 3B are realized by the I/F-processing/image-MIX circuit 3.

The invention claimed is:

1. An imaging apparatus comprising:
    an image sensor for capturing and outputting an image sensing signal;
    said image sensing signal including still images and video images;
    image sensing signal processing means for receiving said image sensing signal outputted from said image sensor, wherein said image sensing signal is output sequentially through a process of conversions between vertical and horizontal registers per frame period;
    a first recording medium on which images captured by the image sensor are recorded;
    a second recording medium which is removable from the imaging apparatus;
    a first signal processing means which processes said image sensing signal and generates a first format image signal;
    a second signal processing means which encodes said image sensing signal and generates a second format image signal;
        wherein, both still images and video images processed by said first signal processing means are stored to the first recording medium;
        wherein, still images processed by said first signal processing means are stored on said first recording medium in a video format for a predetermined time period, and still images encoded by said second signal processing means are stored on said second recording medium in a still image format.

2. An imaging apparatus according to claim 1, further comprising a scan converter means for receiving the image sensing signal from the image sensing signal processing means and converting said image sensing signal into an interlace scan signal if said image sensing signal is in a progressive scan mode,
    wherein the converted image sensing signal is stored in the first recording medium.

3. An imaging apparatus according to claim 1, wherein the image sensing signal outputted by said image sensor is in an interlace mode when said video image is captured and in a progressive scan mode when said still image is captured.

4. An imaging apparatus according to claim 1, wherein the captured still image is stored for a predetermined time period in the first recording medium.

5. An imaging apparatus according to claim 1, wherein, a voice signal is recorded corresponding to the still image during recording of said still image.

6. An imaging method according to claim 1, wherein the image sensing signal outputted by said image sensor is in an interlace mode when said video image is captured and in a progressive scan mode when said still image is captured.

7. An imaging method comprising the steps of:
    capturing and outputting an image sensing signal from an image sensor; said image sensing signal including still images and video images;
    supplying said image sensing signal from the image sensor to an image sensing signal processing means,
        wherein said image sensing signal is supplied sequentially through a process of conversions between vertical and horizontal registers per frame period;
    a first signal processing step of processing said image sensing signal and generating a first format image signal;
    a second signal processing step of encoding said image sensing signal and generating a second format image signal;
    recording images captured by the image sensor in a first recording medium;
        wherein, both still images and video images are stored to the first recording medium;
    recording images captured by the image sensor in a second recording medium which is removable from the image sensor;
        wherein, still images processed in said first signal processing step are stored on said first recording medium in a video format for a predetermined time period and still images encoded in said second signal processing step are stored on said second recording medium in a still image format.

8. An imaging method according to claim 7, further comprising the steps of:
    receiving the image sensing signal from the image sensing signal processing means;
    converting said image sensing signal into an interlace scan signal if said image sensing signal is in a progressive scan mode; and
    storing the converted image sensing signal in the first recording medium.

9. An imaging method according to claim 7, wherein, the captured still image is stored for a predetermined time period in the first recording medium.

10. An imaging method according to claim 7, wherein, a voice signal is recorded corresponding to the still image during recording of said still image.

* * * * *